United States Patent [19]
Booty

[11] 4,410,161
[45] Oct. 18, 1983

[54] MOUNTING APPARATUS FOR OUTBOARD TROLLING MOTORS

[75] Inventor: Robert A. Booty, Oshkosh, Wis.

[73] Assignee: Brunswick Corporation, Skokie, Ill.

[21] Appl. No.: 220,387

[22] Filed: Dec. 29, 1980

[51] Int. Cl.$^3$ .......................... F16M 1/00; F16M 3/00
[52] U.S. Cl. ....................................... 248/642; 440/63
[58] Field of Search ............ 248/640, 641, 642, 281.1; 440/6, 62, 63, 900

[56] References Cited

U.S. PATENT DOCUMENTS

| | | | |
|---|---|---|---|
| 3,674,228 | 7/1972 | Horton | 248/642 |
| 3,861,628 | 1/1975 | Krieger | 440/63 X |
| 3,865,335 | 2/1975 | Roller | 440/62 X |
| 3,954,080 | 5/1976 | Weaver | 440/63 X |
| 3,960,461 | 1/1976 | Brock | 248/642 X |
| 3,999,500 | 12/1976 | Friedel | 248/642 X |
| 4,008,680 | 2/1977 | Alexander | 440/6 |
| 4,033,530 | 7/1977 | Harris | 248/642 |
| 4,129,088 | 12/1978 | Foley | 248/640 X |
| 4,154,417 | 5/1979 | Foley | 248/640 |
| 4,268,258 | 5/1981 | Beem | 248/642 X |

*Primary Examiner*—J. Franklin Foss
*Attorney, Agent, or Firm*—O. T. Sessions

[57] ABSTRACT

The invention provides a mounting apparatus for outboard trolling motors. A linkage having equal length bars is pivotally mounted to the outboard motor swivel bracket (14) and to a mounting bracket (13) to constrain the outboard motor (10) to rotate 90 degrees between its operating position and its retracted position as the linkage arms (15, 19) rotate approximately 180 degrees. A latch (24) secures the swivel bracket (14) to the mounting bracket (13) in the operating position.

7 Claims, 6 Drawing Figures

MOUNTING APPARATUS FOR OUTBOARD TROLLING MOTORS

TECHNICAL FIELD

This invention relates to outboard motors and particularly to mounting apparatus for small trolling motor units.

BACKGROUND ART

Small electric outboard motors are frequently used as auxiliary power units for boats having another primary means of propulsion. These motors typically include a mounting apparatus to provide movement between an operating position and a retracted position wherein the outboard motor can be retained within the boat when the primary propulsion means is in operation. The mounting apparatus should be sturdy and reliable and should provide a solid support for the outboard motor both in the running position and its retracted position.

A variety of mounting devices for small outboards are disclosed in the prior art. One such device is disclosed in U.S. Pat. No. 3,674,228 and Reissue No. 28,176 to Horton in which two unequal length arms are pivotally attached to a bracket mounted on the boat deck. The motor is supported in its operating position entirely by the arms. Other mounting arrangements are shown in U.S. Pat. Nos. 3,874,318 to Langley, 3,870,258 to Shimankas et al, 3,948,472 to Metcalf, and 3,999,500 to Friedal et al.

DISCLOSURE OF INVENTION

The present invention is directed to an outboard motor mounting apparatus for moving an outboard motor between an operating position and a retracted position. Generally, the mounting apparatus includes a mounting bracket, a swivel bracket for supporting the outboard motor, and first and second equal length arms pivotally attached at different points to both the mounting bracket and the swivel bracket. On the mounting bracket the pivot axis for the second arm is above and outside the axis for the first arm, while on the swivel bracket, in its operating position, the pivot axis for the second arm is below and outside the axis for the first arm. A third arm, parallel to the second arm and on the opposite side of the first central arm may be included to provide greater lateral strength.

The swivel bracket preferably rests on the mounting bracket when the outboard motor is in its operating position and a latch can be provided to latch the swivel bracket to the mounting bracket. In the preferred embodiment the latch member includes a cam surface to force a wedge shaped protrusion extending from the swivel bracket against the mounting bracket. A remote actuator can be provided to remotely release the latch member, and in the preferred embodiment the remote actuator includes an element engaged by one of the arms as the outboard motor is moved to its retracted position to return the latch member to a position where it can engage the finger on the swivel bracket.

BEST MODE FOR CARRYING OUT THE INVENTION

Figure 3:
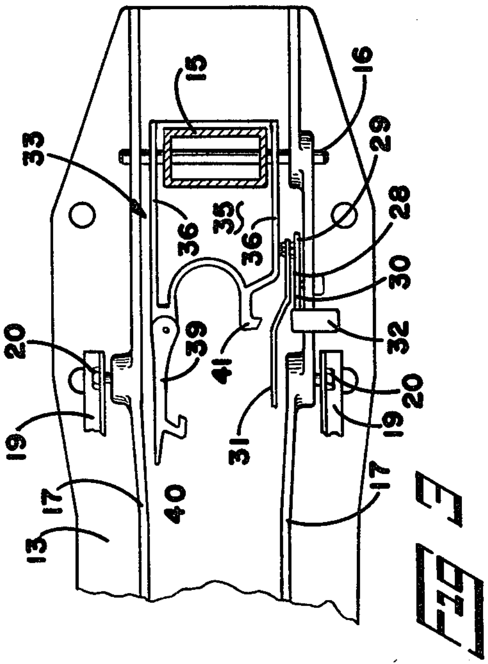
FIG. 3 is a partial top view showing details of the mounting apparatus.
Figure 2:
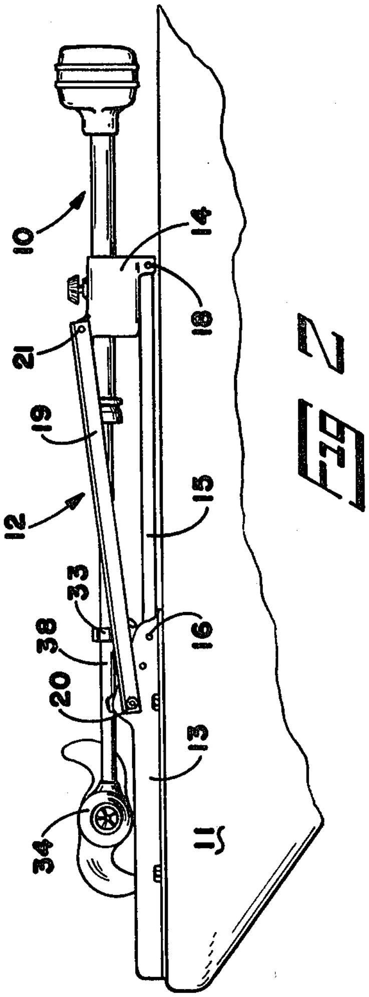
FIG. 2 is a side view showing the mounting apparatus in its retracted position.
Figure 1:
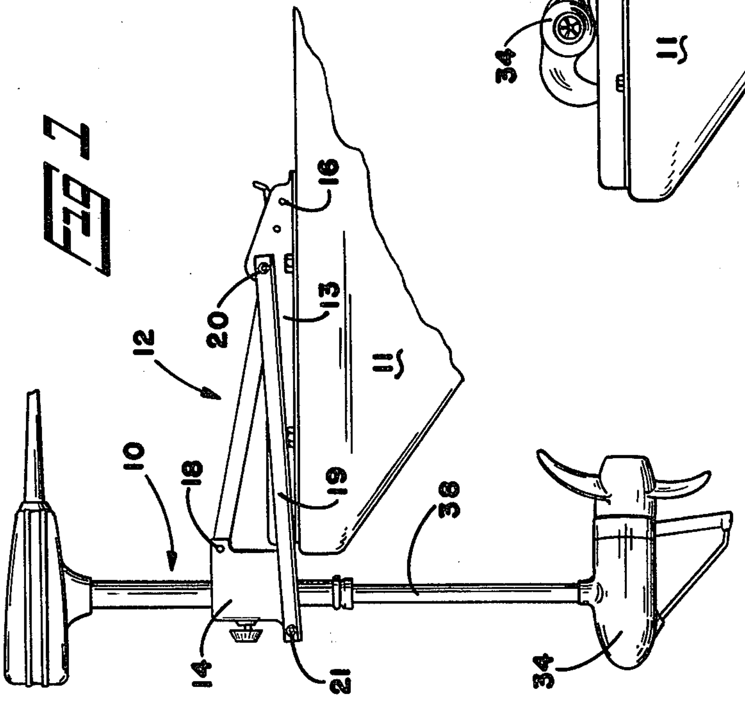
FIG. 1 is a side view showing the mounting apparatus of the invention in its operating position.

Referring to the drawings, the present invention is directed to the construction of a trolling motor unit 10 which is attached to a forward horizontal deck of a boat 11. The outboard motor unit 10 is secured to the deck by a pivotable mount assembly 12 for selective positioning of the outboard motor unit 10 between an operating or propulsion position shown in FIG. 1 and a retracted or transport position shown in FIG. 2. The unit is particularly suitable for fishing where accurate maneuvering at low speeds is desireable. In such systems the watercraft will generally be provided with an alternative drive to provide high speed operation.

The outboard motor unit 10 may be of any type, though usually it will be an electric outboard motor. Since the invention is directed to the mounting apparatus, the motor is only generally described here.

In the specific embodiment illustrated in the Figures, the propulsion unit 10 is supported from the mounting bracket 13 by a linkage assembly pivotally attached to the mounting bracket 13 and to the swivel bracket 14. The linkage assembly includes a first central arm 15 having a box beam construction. The central arm 15 is pivotally attached at a first end to the mounting bracket 13 to pivot about a first axis formed by a through pin 16 extending between the two upstanding walls 17 of the mounting bracket 13 on the inboard or inside end of the bracket 13. At its other, second, end the central arm 15 is pivotally attached to the swivel bracket 14 by the through pin 18 on the upper inside of the swivel bracket 14 which forms a second axis. The linkage assembly is completed by second and third side arms 19 equal in length to the central arm 15. The side arms 19 are angle bars having a first flange parallel to the sides of the mounting bracket and a second flange extending outwardly perpendicular to the first flange. The side arms 19 are pivotally attachea at their first ends to the outside of the mounting bracket walls 17 by separate bolts 20 on a common third axis. On their second ends, the side arms 19 are pivotally attached to the lower outboard or outside portion of the swivel bracket 14 by a through bolt 21 which forms a fourth axis. The linkage assembly thus formed constrains the propulsion unit 10 to rotate 90 degrees between its operating position and its retracted position as the linkage arms 15 and 19 rotate approximately 180 degrees.

In the operating position the propulsion unit 10 is supported on the mounting bracket 13 by a wedge shaped protrusion 22 from the swivel bracket 14 which rests on the outside end of the mounting bracket base 23 between the two upstanding side flanges 17. The weight of the propulsion unit 10 is thus supported primarily by the swivel bracket 14 resting on the mounting bracket 13. The linkage assembly primarily holds the propulsion unit 10 in place, thereby substantially eliminating bending loads on the linkage arms 15 and 19.

A latch is provided to attach the swivel bracket 14 to the mounting bracket 13 in the operating position. The latch includes a latch member 24 having a cam member 25 and a shaft 26 pivotally attached between the upstanding side flanges 17 of the mounting bracket 13. A coil latch spring 27 surrounds the shaft 26 and has one end hooked over the side of the cam or eccentric member 25 to bias the cam member 25 toward the swivel bracket 14. The cam member 25 has two identical cam surfaces of increasing radius to assure contact with both sides of the upper surface of the wedge shaped protrusion 22 which extends from the swivel bracket 14. The latch assures secure positioning of the propulsion unit 10 in the operating position.

Figure 4:
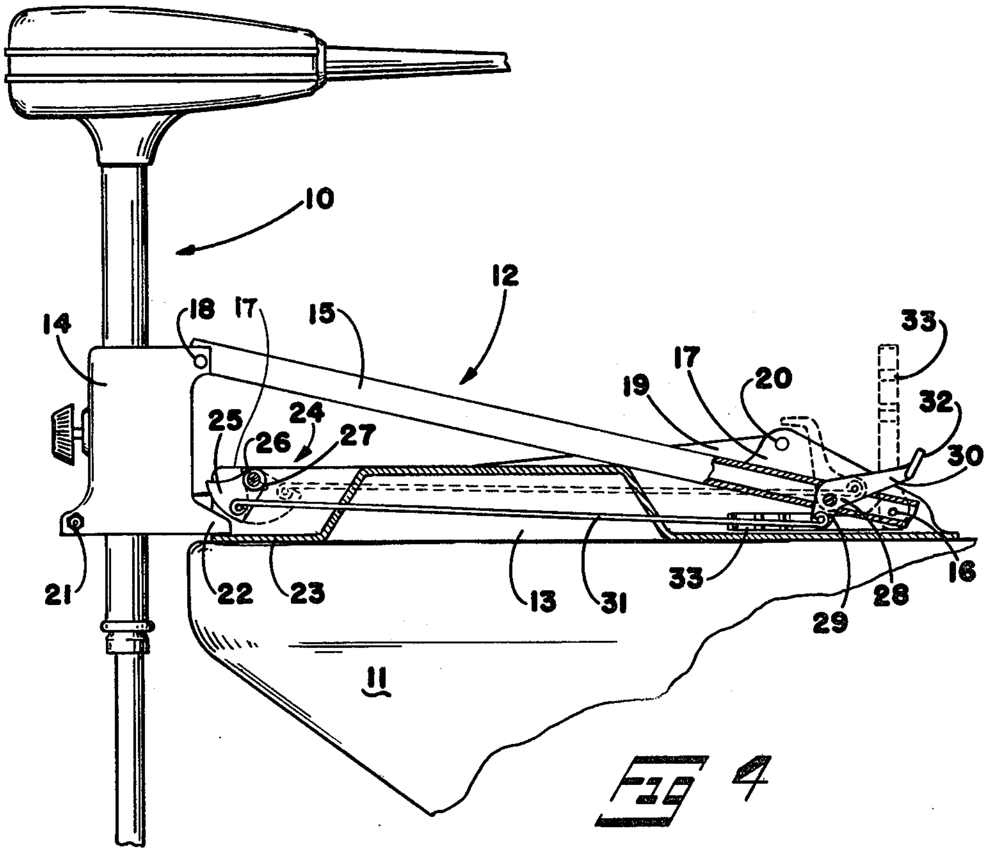
FIG. 4 is a partial sectional view of the mounting apparatus in its operating position.

A remote actuator 28 pivotally mounted on the inside of one of the upstanding walls 17 on the inside end of the mounting bracket 13 allows the operator to release the latch 24 from the inboard end of the mounting bracket 13. The remote actuator 28 includes a lever arm 29 and a handle 30 for rotating the actuator 28. A wire 31 connected to the lever arm 29 and the latch member 24 rotates the latch member 24 to the disengaged position, shown in dotted lines in FIG. 4, when the handle 30 is rotated upwardly. The latch spring 27 keeps the wire 31 loaded in tension, and the wire 31 is attached to the lever arm 29 at a point which provides an over center position whereby the latch 24 is held in the disengaged position by the latch spring 27. The handle 30 includes an end element 32 protruding toward the side which is engaged by one of the side linkage arms 19 when the propulsion unit 10 is moved to its retracted position, thus automatically returning the latch member 24 to a position where it can engage the wedge shaped protusion 22 on the swivel bracket 14.

Figure 5:
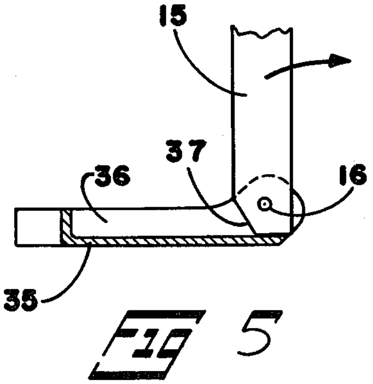
FIGS. 5 and 6 show details of the in board pivot point.
Figure 6:
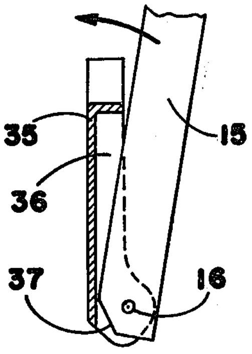

A fold down support 33 is provided to help support the lower unit 34 in the retracted position and to lock it in place. The support 33, which includes a support member 35 having a channel shaped cross section, is mounted on the same pin 16 as the central linkage arm 15, with the central arm 15 nested between the side flanges 36 of the support member 35. The lower end of the central arm is cut at a 45° angle on one side 37 to allow the central arm 15 to pivot relative to the support member 35. As shown in FIG. 5, the lower end of the central arm 15 engages the lower portion of the support member 35 at a 90° angle to raise the support 33 to the standing position, shown in dotted lines in FIG. 4, as the propulsion unit 10 is moved to the retracted position. As the propulsion unit 10 is lowered to the operating position, the central arm 15 will first rotate relative to the support member 35 and then when the surface of the central arm 15 engages the support member 35, will rotate the support member 35 down to its fold down position, as illustrated in FIG. 6. In the retracted position the tubular portion 38 of the propulsion unit 10 is cradled in the upper end of the support member 35. A flexible clamp arm 39 has one end pivotally attached to one side of the support member 35 and has a hook 40 at the other end to snap over the notch 41 on the opposite side of the support member 35. Thus the propulsion unit 10 may be locked in its retracted position.

I claim:

1. An outboard motor mounting apparatus for moving an outboard motor between a generally vertical operating position and a generally horizontal retracted position, said mounting apparatus comprising:

(A) a mounting bracket;

(B) a swivel bracket for supporting said outboard motor, said swivel bracket resting directly on said mounting bracket when said outboard motor is in said operating position;

(C) a first central arm having a first end pivotally attached to rotate about a first axis fixed on said mounting bracket and a second end pivotally attached to rotate about a second axis fixed on said swivel bracket;

(D) second and third arms, one on each side of said first arm, said second and third arms having a first end pivotally attached to rotate about a third axis fixed on said mounting bracket and said second and third arms each having a second end pivotally attached to rotate about a fourth axis fixed on said swivel bracket; and (E) a latch means for latching said swivel bracket directly to said mounting bracket when said outboard motor is in the operating position.

2. The mounting apparatus defined in claim 1 wherein said first, second, and third arms are all approximately the same length, and said first central arm is located generally above said second and third arms in the operating position.

3. The mounting apparatus defined in claim 1 wherein said latch means includes a protrusion extending inward from said vertical bracket toward said mounting bracket, said protrusion resting on said mounting bracket when said outboard motor is in the operating position, and a spring biased latch member mounted on said mounting bracket to releasably latch said protrusion against said mounting bracket.

4. The mounting apparatus defined in claim 3 wherein said latch means further includes a remote pivotally attached near the inward end of said mounting bracket for remotely releasing said latch means and holding said latch member in its released position.

5. The mounting apparatus defined in claim 4 wherein said remote actuator includes an element engaged by one of said arms as said outboard motor is moved to its retracted position to return said latch member to a position where it can engage said protrusion.

6. The mounting apparatus defined in claim 5 wherein said latch member includes a cam surface to force said protrusion against said mounting bracket.

7. An outboard motor mounting apparatus for moving an outboard motor between a generally vertical operating position and a generally horizontal retracted position, said mounting apparatus comprising:

(A) a mounting bracket;

(B) a swivel bracket for supporting said outboard motor;

(C) a first arm having a first end pivotally attached to rotate about a first axis fixed on said mounting bracket and a second end pivotally attached to rotate about a second axis fixed on said swivel bracket; and (D) a support member pivotally attached to said mounting bracket to rotate about said first axis, said support member having a first surface engaged by said first arm to rotate said support member from a horizontal position to a vertical position as said outboard motor is moved from said operating position to said retracted position and a second surface engaged by said first arm to rotate said support member from said vertical position to said horizontal position as said outboard motor is moved from said retracted position to said operating position, said support member acting to support said outboard motor in said retracted position.

* * * * *